Nov. 2, 1965          G. M. ARTHUR          3,215,477
LUBRICATED BEARING ASSEMBLY
Filed Dec. 26, 1962

INVENTOR.
GENE M. ARTHUR
BY *James A. Smith*
ATTORNEY

![United States Patent Office]

3,215,477
Patented Nov. 2, 1965

3,215,477
LUBRICATED BEARING ASSEMBLY
Gene M. Arthur, Norwalk, Ohio, assignor to Clevite
Harris Products, Inc., a corporation of Ohio
Filed Dec. 26, 1962, Ser. No. 246,891
7 Claims. (Cl. 308—26)

This invention relates to bearing assemblies and more particularly to an improved self-lubricating bearing assembly.

Insufficient or improper lubrication of a bearing surface is one of the major causes of bearing wear and failure. With the possible exception of bearings operating submerged in lubricating oil it is extremely difficult to continuously maintain a lubricating film at the point of maximum wear on the bearing surface. The problem is augmented in many applications where the point of maximum wear on the bearing surface varies with the load. For example, in the case of a shaft bearing, load variations may produce lateral forces on the shaft causing excessive wear on particular areas of the bearing surface depending on the direction of application of the forces.

Another problem contributing to short bearing life in many applications is the sudden or abrupt removal or applications of load resulting in extreme wearing forces being applied to the bearing surfaces. Such sudden load variations and the resulting shock imparted to the bearing coupled with vibrational forces can result in failure of the most precision bearing assemblies.

It is a principal object of this invention to provide an improved self-lubricating bearing.

Another object of the invention is to lubricate a bearing surface at the point of maximum wear.

Another object of the invention is to resiliently support a bearing surface to minimize wear caused by abrupt load changes.

Another object of the invention is to provide an improved article of manufacture comprising a resilient supporting part for a self-lubricated bearing.

In general the invention contemplates a resilient supporting part having a deformable cavity in which a rigid bearing part defining a bearing surface is received by elastic deformation of the material surrounding the cavity. The cavity is shaped to define lubricant reservoirs behind the bearing part in which lubricant is entrapped and sealed during insertion of the bearing part into the cavity. The bearing part is provided with lubricant passages which permit passage of lubricant from the sealed reservoirs to the bearing surface to establish a lubricant film. In the disclosed embodiments, the bearing part is formed from a porous sintered metal material having pores through which lubricant of a predetermined viscosity will pass to the bearing surface.

Other objects and advantages will become apparent from the following description taken in conjunction with the accompanying drawings wherein.

Figure 1:
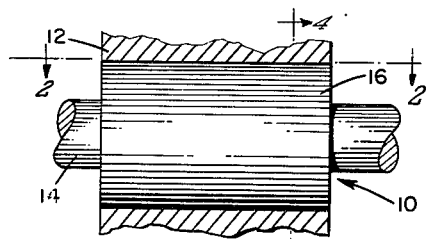
FIGURE 1 is a longitudinal view of a shaft bearing assembly embodying the invention.
Figure 2:
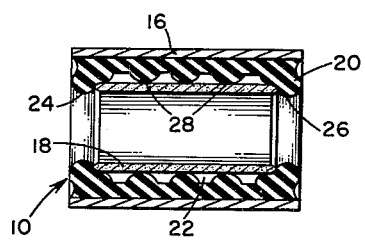
FIGURE 2 is a section taken along the line 2—2 of FIGURE 1 with the shaft and support omitted.
Figure 3:
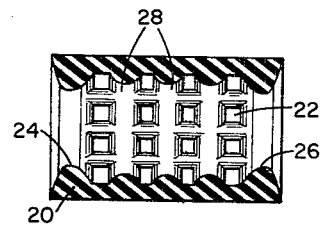
FIGURE 3 is a sectional detail of a part shown in FIGURE 2.

Referring particularly to FIGURES 1, 2 and 3 of the drawings there is shown a bearing assembly identified generally by the reference numeral 10 adapted to be mounted within a fixed support 12 and to receive and provide bearing support for an axially movable or rotatable shaft 14.

The bearing assembly 10 depicted is particularly suitable for use as a clutch or brake pedal shaft bearing, and shaft 14 may be considered representative of an axially movable pedal actuated shaft. The bearing assembly 10 as shown most clearly in FIGURES 1 and 2 comprises an outer metal sleeve 16 adapted to be fixedly mounted for example, such as by a force fit in a bore of support 12, and a smaller diameter inner bearing sleeve 18 defining an inner peripheral shaft bearing surface. The inner bearing sleeve 18 is formed from a porous sintered metal material having pores through which lubricant can pass as will later be described in more detail.

The inner bearing sleeve 18 is resiliently supported on outer sleeve 16 in spaced relationship therewith by a hollow soft rubber cylindrical shaped part 20 which is shown in detail in FIGURE 3. The part 20 is molded to the configuration shown in detail in FIGURE 3 and is provided with an inner peripheral expandable recess or cavity 22 formed between a pair of inwardly projecting annular shoulders defining shaft seals 24 and 26 at the opposite ends of part 20. The inner bearing sleeve 18 is preferably of greater length and diameter than cavity 22 in the free state of the rubber material to be received by elastic deformation of part 20. In installation, the outer peripheral surface of rubber part 20 is bonded to the inner peripheral surface of sleeve 16 by a suitable rubber to metal bonding process whereupon inner sleeve 18 is forced into cavity 22 to be retained between shaft seals 24 and 26 by frictional engagement resulting from elastic deformation of the rubber part 20. The space between shaft seals 24 and 26 and diameter of cavity 22 is preferably such in relation to the corresponding dimensions of inner sleeve 18 to create a pressure retaining force on the latter by elastic deformation which exceeds the maximum frictional force of the shaft 14 on the inner peripheral bearing surface of the sleeve 18 by a substantial safety factor. Thus, the inner sleeve 18 is fixedly mounted and resiliently supported by part 20 within outer sleeve 16.

Referring now to the specific construction of rubber part 20 a grid pattern of longitudinal and circumferential integral raised ribs 28 are formed on the inner peripheral surface of part 20 in cavity 22 to be engaged by the outer peripheral surface of inner bearing sleeve 18 when the latter is positioned in cavity 22 as shown in FIGURE 2. The ribs 28 as shown more clearly in FIGURE 3 serve to subdivide the annular space between the inner peripheral surface of part 20 within cavity 22 and outer peripheral surface of bearing sleeve 18 into a plurality of rectangular reservoir spaces which as will later be described are filled with lubricant. The reservoirs thus established are sealed and isolated from each other by sealing engagement of the ends of sleeve 18 with shaft seals 24 and 26 and sealing engagement of the outer peripheral surface of sleeve 18 with ribs 28.

In assembly of the bearing assembly 10 the rubber part 20 is first bonded to the inner peripheral surface of outer sleeve 16 by a suitable bonding process as previously described. The assembly of outer sleeve 16 and part 20 is then immersed in lubricant and inner bearing sleeve 18 is fitted into recess 22 to seal the reservoirs defined by ribs 28 and to entrap lubricant therein. The lubricant immersion assembly process not only insures complete filling of the oil reservoirs but provides lubricant coated surfaces to facilitate insertion of bearing sleeve 18 into expandable cavity 22. Upon removal from the lubricant the completed bearing assembly 10 is wiped clean of excess lubricant and inspected for possible lubricant leakage at the ends of sleeve 18.

In operation of the bearing assembly 10 the outer sleeve 16 is fixedly supported such as being force fitted within a bore of support 12 as illustrated in FIGURE 1 to align the assembly 10 with shaft 14. The porous material of inner bearing sleeve 18 will become saturated with lubricant from the sealed lubricant reservoirs to establish a lubricant film over the inner peripheral bearing surface. As lubricant is removed from the bearing surface during movement of shaft 14 additional lubricant will pass from the sealed reservoirs through the porous material to thus maintain the lubricant film on the bearing surface. Accordingly, until the supply of lubricant in the oil reservoirs is exhausted a self-lubricating action will occur to provide optimum shaft lubrication.

The seals 24 and 26 engaged by the bearing sleeve 18 project above the bearing surface and have an inner diameter less than the diameter of shaft 14 so as to resiliently engage the latter. The seals 24 and 26 function to minimize leakage of lubricant along the shaft 14 and thus to materially increase the life of the reservoir lubricant particularly when the assembly 10 is applied as a bearing support for an axially movable shaft.

Figure 4:
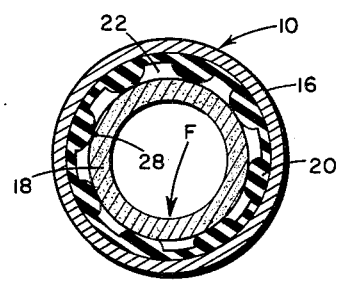
FIGURE 4 is a section taken along the line 4—4 of FIGURE 1 illustrating the operation of the bearing assembly during an abnormal load condition.

The natural resiliency of part 20 provides a flexible mounting for bearing sleeve 18 which absorbs vibrational forces and provides a cushioning action during excessive load conditions. This resiliency also renders the bearing sleeve 18 self-aligning with respect to the supported shaft and eliminates the need for exact alignment of the bearing assembly with the shaft. Additionally, the resilient support of bearing sleeve 18 is utilized to effect a pumping action which augments lubrication of the bearing surface at the point of maximum wear during heavy or changing load conditions. Referring specifically to FIGURE 4 assume that a sudden load applied to shaft 14 produces a downward lateral force F which, due to the resiliency of part 20, results in a slight momentary downward lateral displacement of bearing sleeve 18. As bearing sleeve 18 is displaced compression of the rubber material of part 20 will occur adjacent the point of application of force as illustrated in FIGURE 4 to cause a reduction in volume of the lubricant reservoirs below the point of application of force. The decrease in volume of the affected lubricant reservoirs will cause a quantity of lubricant to be effectively pumped or forced under pressure through the pores of the porous material to the adjacent bearing surface. Thus, a pumping action occurs which effects lubrication of the bearing surface at the point of maximum wear under abnormal conditions regardless of the direction of the applied force.

The pumping operation described will occur even though the lubricant supply is partially or nearly depleted. If the lubricant reservoirs are for example only partially filled with lubricant the porous material will still be oil saturated and compression of even the air volume in the reservoir chambers will cause instantaneous appearance of a lubricant film on the adjacent bearing surface.

It will be apparent that various types of lubricant and various densities of the porous material forming bearing sleeve 18 may be combined to achieve proper lubrication in various applications. To achieve the maximum life from the lubricant supply the porousness of bearing sleeve 18 should only be such that the lubricant will pass through the material by viscous flow until a surface film is established.

It will be apparent to those skilled in the art that the bearing sleeve 18 may be alternately formed from non-porous material and provided with a plurality of spaced passages such as drilled ports for passage of lubricant from the reservoirs to the bearing surface. The use of a porous bearing sleeve, however, materially reduces the fabrication costs of the part however and has been found to provide a sufficiently durable bearing surface in many applications.

Figure 5:
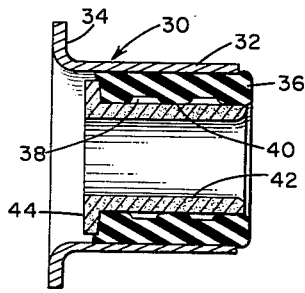
FIGURE 5 is a longitudinal sectional view of a second embodiment of a shaft bearing assembly.

In FIGURE 5 of the drawings I have illustrated the invention embodied in a shaft bearing assembly 30 of the type generally employed for the drum support bearing in an automatic clothes dryer. This assembly comprises an outer sleeve 32 having a flange 34 on one end thereof by means of which the assembly may be clamped to the edges of an opening for example in a sheet metal part. In this case a molded rubber part 36 having a central longitudinal cavity or passage 38 has its outer peripheral surface bonded to the inner peripheral surface of sleeve 32. A grid pattern of raised circumferential and longitudinal ribs 40 is formed on the surface of passage 38 similar to the ribs 28 depicted in FIGURES 2 and 3. An inner bearing sleeve 42 formed from a porous sintered metal material and having an end flange 44 and an outer diameter larger than the diameter of the cavity 38 in the free state of the rubber material is positioned in cavity 38 and retained by frictional engagement with the ribs 40. Flange 44 engages the end of part 36 as shown to provide added restraint of bearing sleeve 42 in one direction.

The assembly 30 functions in the same manner as assembly 10 previously described with the exception that shaft oil seals are omitted in the embodiment shown in FIGURE 5. The grid pattern of ribs 40 have sealing engagement with the peripheral surface of inner bearing sleeve 42 to define a plurality of isolated lubricant reservoirs from which lubricant is supplied to the inner peripheral bearing surface of sleeve 42. Similar to the assembly 10 a pumping action occurs during varying load conditions to augment the shaft lubrication at the point of maximum bearing wear.

Figure 6:
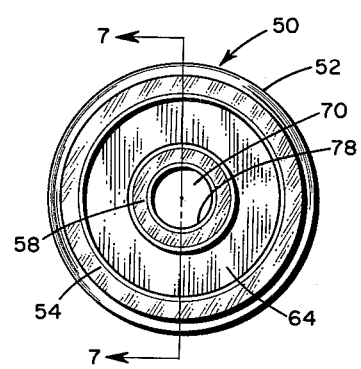
FIGURE 6 is a side view of a wheel embodying the invention.
Figure 7:
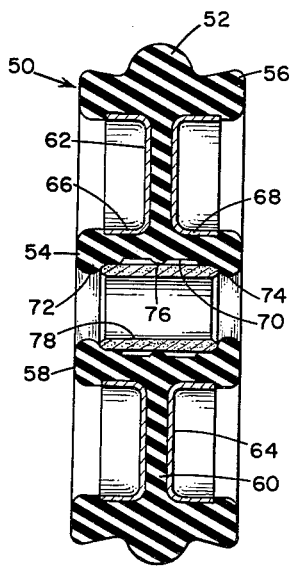
FIGURE 7 is a sectional view taken along the line 7—7 of FIGURE 6.

Referring to FIGURES 6 and 7 of the drawing I have illustrated the application of the invention to a sleeve bearing carried by rotatable wheel. More particularly, there is shown a wheel 50 which in this instance comprises an idler wheel for shaft mounting and having an annular peripheral rounded surface 52 adapted to be engaged by a driving part such as a rotatable drum (not shown).

The idler wheel 50 comprises a molded rubber part 54 of generally disk-shaped configuration having an outer peripheral rim portion 56 spaced from a central hub portion 58 by an integrally molded disk portion 60. Rigidity is imparted to the part 54 by metal stiffener rings 62 and 64 having a generally channel-shaped cross-section as shown in FIGURE 7. The stiffener rings 62 and 64 are received in opposite sides of part 54 in recesses 66 and 68 respectively formed in the cavities between the rim portion 56 and hub portion 58. The stiffener rings 62 and 64 are oversize with respect to recesses 66 and 68 to expand the same and be rigidly retained therein by frictional engagement.

When snapped into position as shown the rings 62 and 64 will increase slightly the outer diameter of portion 56 and decrease slightly the inner diameter of portion 58. The stiffener rings 62 and 64 add considerable rigidity to the assembly and allow the disk section 60 to be quite thin.

The hub portion 58 of part 54 is provided with a central longitudinal passage or cavity 70 having annular raised shaft seals 72 and 74 at opposite ends thereof similar to the part 20 of the bearing assembly 10 illustrated in FIGURES 1, 2 and 3. A grid pattern of ribs 76 are formed on the surface of cavity 70 similar to the previously described embodiments. To complete the wheel assembly a bearing sleeve 78 formed from sintered porous material is seated within cavity 70 by elastic deformation of the rubber material with the ends thereof in sealing engagement with the shaft seals 70 and 72 and the peripheral surface thereof in sealing engagement with ribs 76. The outer diameter and length of sleeve 78 are proportionately larger than corresponding dimensions of cavity 70 to effect retention of the sleeve 78 by elastic deformation and frictional engagement.

Similar to the previously described embodiments of the invention ribs 76 subdivide the space between the peripheral surface of sleeve 78 and cavity 70 into a plurality of reservoirs for lubricant to effect lubrication of the bearing surface of sleeve 78 by passage of lubricant through the porous material thereof.

The process of assembling wheel 10 is generally similar to the previously described embodiments. The stiffener rings 62 and 64 are first inserted into recesses 66 and 68, respectively. The resulting combination is then immersed in lubricant whereupon sleeve 78 is inserted to entrap lubricant in the lubricant reservoirs and seal the same.

The resiliency of rubber part 54 forming the body portion of idler wheel 50 also establishes a pumping action to augment lubrication of the bearing surface of sleeve 78. In the case of a wheel such as the disclosed idler wheel this feature is particularly desirable in that the force of the driving member (not shown) on the periphery of the wheel 50 during rotation thereof results in a continuous rotating lateral wearing force on the bearing surface. The resiliency of the part 52 is preferably such that the force of the driving member results in compression of the rubber to effect a continuous pumping action as the wheel rotates to augment the normal self-lubrication thereof.

It will be apparent that the self-lubricated bearing principle disclosed herein may be variously applied both to moving and fixed bearing surfaces. Furthermore, it will be apparent that the flexible part forming the basis for the self-lubricating bearing assembly herein disclosed is an improved article of manufacture in itself in that it provides for convenient assembly of a self-lubricating bearing by the simple insertion of a porous or ported rigid bearing part.

While there have been described what at present are believed to be the preferred embodiments of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed and desired to be secured by United States Letters Patent is:

1. A wheel assembly comprising; a flexible wheel-like part formed from rubber-like material having an integral outer rim portion and an integral hub portion defining a centrally disposed cylindrical cavity having a pattern of raised surfaces formed on the wall thereof, and having a pair of annular recesses between said rim portion and said hub portion on opposite sides of said wheel-like part; a porous metal sleeve defining an inner peripheral shaft bearing surface retained within said cavity by elastic deformation of said part and having its outer peripheral surface engaging said raised surfaces to define therewith a plurality of lubricant reservoirs; said porous sleeve defining lubricant passages through the wall thereof in communication from said reservoirs to said inner periperal shaft bearing surface; and a pair of annular metal stiffener rings retained in said pair of annular recesses by elastic deformation of said flexible wheel-like part to impart rigidity to the assembly.

2. A wheel assembly as claimed in claim 1 wherein said sleeve is formed from porous sintered metal material having pores which define said lubricant passages.

3. A wheel assembly as claimed in claim 2 wherein said raised surfaces comprise a grid pattern of integral longitudinal and circumferential ribs defining non-intercommunicating lubricant reservoirs with said outer peripheral surface of said sleeve.

4. A wheel body comprising: a resilient rubber-like part of generally wheel configuration defining an integral rim portion and a centrally disposed hub portion; said hub portion defining a central cylindrical cavity having raised surfaces on the wall thereof; a porous metal sleeve bearing retained in said cavity by elastic deformation of said rubber-like part with said raised surfaces engaging the peripheral surface of the sleeve to define therewith a plurality of lubricant reservoirs for communication with the pores in the sleeve bearing.

5. A wheel body as claimed in claim 4 wherein said raised surfaces comprise a grid pattern of longitudinal and circumferential ribs.

6. A wheel body as claimed in claim 5 wherein integral annular raised shoulders are formed on the wall of said cavity at the opposite ends thereof for engagement with a shaft extending through the bearing sleeve.

7. A wheel body as claimed in claim 6 wherein said part defines annular recesses on opposite sides thereof between said rim portion and said hub portion adapted to receive annular metal stiffener rings.

References Cited by the Examiner
UNITED STATES PATENTS

| | | | |
|---|---|---|---|
| 783,870 | 2/05 | Knapp | 308—240 X |
| 1,416,988 | 5/22 | Sherwood | 308—24 X |
| 1,855,315 | 4/32 | Schacht | 16—45 |
| 2,149,983 | 3/39 | Smith | 308—121 X |
| 2,223,872 | 12/40 | McWhorter. | |
| 2,276,936 | 3/42 | Cooley | 308—121 X |
| 2,761,746 | 9/56 | Abel | 308—240 X |
| 2,767,035 | 10/56 | Von Euw | 308—78 |
| 2,839,340 | 6/58 | Merchant | 308—26 |
| 3,055,639 | 9/62 | Chaft | 308—238 X |
| 3,107,946 | 10/63 | Drake | 308—26 |
| 3,133,769 | 5/64 | Drake | 308—26 X |

DON A. WAITE, *Primary Examiner.*
ROBERT C. RIORDON, *Examiner.*